(12) United States Patent
Furuheim et al.

(10) Patent No.: US 9,029,705 B2
(45) Date of Patent: May 12, 2015

(54) POWER CABLE WITH A WATER BARRIER LAMINATE

(75) Inventors: Knut Magne Furuheim, Fredrikstad (NO); Sverre Hvidsten, Trondheim (NO)

(73) Assignee: Nexans, Paris (FR)

( * ) Notice: Subject to any disclaimer, the term of this patent is extended or adjusted under 35 U.S.C. 154(b) by 244 days.

(21) Appl. No.: 13/232,140

(22) Filed: Sep. 14, 2011

(65) Prior Publication Data

US 2012/0080213 A1    Apr. 5, 2012

(30) Foreign Application Priority Data

Sep. 30, 2010    (NO) .................................... 20101359

(51) Int. Cl.
*H01B 9/02* (2006.01)
*H01B 11/06* (2006.01)
*H01B 7/28* (2006.01)

(52) U.S. Cl.
CPC ........................................ *H01B 7/28* (2013.01)

(58) Field of Classification Search
CPC .......... H01B 11/1033; H01B 11/1016; H01B 7/0861; H01B 7/1875; H01B 7/2825; H01B 7/282; H01B 7/14; H01B 11/1808; H01B 11/1834

USPC ..................... 174/36, 107, 102 R, 108, 106 R
See application file for complete search history.

(56) References Cited

U.S. PATENT DOCUMENTS

| | | | |
|---|---|---|---|
| 3,586,756 A * | 6/1971 | Garner et al. ................. 174/107 |
| 3,679,503 A * | 7/1972 | Dembiak et al. ................. 156/54 |
| 3,950,605 A * | 4/1976 | Hori et al. ...................... 174/107 |
| 4,454,379 A * | 6/1984 | Cleveland et al. ............ 174/107 |
| 4,679,898 A * | 7/1987 | Grooten ........................ 385/107 |
| 4,988,669 A * | 1/1991 | Dersch .......................... 505/231 |
| 5,268,531 A * | 12/1993 | Nguyen et al. ................... 174/36 |
| 5,281,488 A * | 1/1994 | Poulsen .......................... 428/624 |
| 5,293,001 A * | 3/1994 | Gebs ............................... 174/36 |
| 5,456,959 A * | 10/1995 | Dawes .......................... 428/34.1 |
| 6,238,802 B1 * | 5/2001 | Leeb ............................. 428/457 |
| 7,087,842 B2 | 8/2006 | Belli et al. |
| 7,285,726 B2 * | 10/2007 | Bremnes ................... 174/102 R |
| 2007/0044992 A1 * | 3/2007 | Bremnes .................. 174/102 R |
| 2007/0044993 A1 * | 3/2007 | Varkey ....................... 174/102 R |

FOREIGN PATENT DOCUMENTS

GB           2105486         3/1983

* cited by examiner

*Primary Examiner* — Timothy Thompson
*Assistant Examiner* — Sherman Ng
(74) *Attorney, Agent, or Firm* — Sofer & Haroun, LLP

(57) ABSTRACT

A power cable having a water barrier laminate where the water barrier laminate has foil made of metal (1) laminated between at least two layers of non insulating polymer foils (2a, 2b) constituting a final laminate (3) that is non insulating.

6 Claims, 1 Drawing Sheet

POWER CABLE WITH A WATER BARRIER LAMINATE

RELATED APPLICATION

Figure 1:
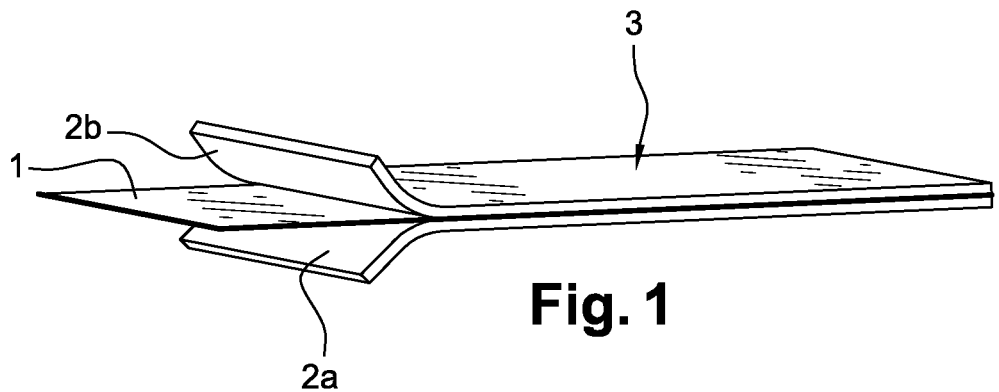

This application claims priority to Norwegian Patent Application No. 2010 1359, filed on Sep. 30, 2010, the entirety of which is incorporated by reference.

FIELD OF THE INVENTION

The present invention relates to power cables comprising water barriers, and for example to water submerged high voltage cables. Moreover, the present invention also concerns methods to construct such water barriers.

BACKGROUND OF THE INVENTION

In subsea cable installations, the cable insulation must be protected from humidity that may lead to electrical breakdown. For example, in cable insulation made from for example polymers, or oil impregnated paper, there are possibilities for water treeing when the humidity is above a certain level that after some time may lead to electrical breakdowns. Different types of water barriers are used in different cable constructions, but the dominating material used for water barriers is lead. This is particularly the case for high voltage power cables. Lead has proved to be a reliable and sturdy sheathing material in this connection, but it has some well known drawbacks. Particularly with large high voltage underwater cables, the weight issue is important because lead contributes much to the total weight. Heavy cables add cost in the whole value chain; in production, under transport, storage and deployment. Even when the cable reaches its economic lifetime, discarding a heavy cable adds cost. Deploying underwater cables in deep waters is of particular interest because the strain in the cable can be considerable.

One other problem with lead is when cables are used dynamically, i.e. when the cable is not used in a fixed position. Lead sheath has a low fatigue limit, making it unsuitable for dynamic applications. Besides, lead is considered as non-environmentally friendly and for some markets replacement of lead is required.

For long high voltage underwater cables, capacitive charges and resulting currents will initiate problems if not dealt with. Preferably these currents are led radially out into the sea water and not led longitudinally along the cable. This is accomplished by using non insulating layers instead of insulating layers in the cables. One alternative, not very convenient in subsea cables, is to have controlled discharging of capacitance at regular intervals. The added cost of using discontinuous deployed cables makes this alternative a prohibitive solution.

Among other metallic materials used as water barriers, aluminum is most often applied, for instance as a corrugated tube protection. The density of aluminum is 2.7 kg/dm$^3$ while lead is 11.4 kg/dm$^3$. However, such corrugated aluminum barriers are normally used on and cables, not on subsea cables. Subsea cables have different and often stricter requirements.

One advantage with lead sheathing in cables is its plasticity properties. The industry has for many years applied lead onto cables with a thickness of for example 5 mm. Such cables are still straight forward deployable.

In GB2105486, a fiber optic cable is foreseen with a water barrier in the form for instance of an aluminum plastics laminate. In fiber optic cables, the problem of water treeing is not present. In the art, laminates intended for use in medium and high voltage cables, comprising a metal water barrier laminated with layers comprising semi conductive polymer layers to discharge capacitive charges to ground (here: sea water) remains to be presented.

WO0146965 describes a water swellable tape internal to a metallic screen, immediately beneath the latter. In the same document another embodiment is described having a thin aluminum foil arranged and glued beneath an outer polymeric sheath, the aluminum foil acting as a barrier to water penetration.

SUMMARY OF THE INVENTION

The present invention seeks to provide a power cable with a flexible non electrically insulating water barrier layer that can replace a conventional water barrier made from lead. Its most important advantage is its flexibility and significantly a lower weight of the total water barrier concept.

According to a first aspect of the present invention, there is provided a power cable with a water barrier laminate, comprising one foil made of metal laminated between at least two layers of non insulating polymer foils constituting a final laminate that is non insulating.

Optionally, for the water barrier laminate, at least one of the surfaces of the laminate is adapted to bond to the other surface of the laminate when the laminate is being lapped or wound around the inner part of the cable that is to be protected with the water barrier.

Optionally, for the water barrier laminate, at least one of the non insulating polymer foils comprises glue that is adapted to gluing said polymer foil to the other surface of the laminate when the laminate is being lapped or wound around the inner part of the cable that is to be protected with the water barrier, the glue and gluing adapted not to insulate the layers being glued together.

Optionally, for the water barrier laminate, at least one of the polymer foils comprising dissimilar properties to those of one other polymer foil.

Optionally, for the water barrier laminate, at least one of the polymer foils comprises a different grade of elasticity than one other polymer foil.

The invention also relates to a water barrier laminate for use in a power cable according to the invention. The main technical feature of a water barrier laminate according to the invention is that it comprises foil made of metal laminated between at least two layers of non insulating polymer foils constituting a final laminate that is non insulating.

SHORT DESCRIPTION OF THE FIGURES

Figure 3:
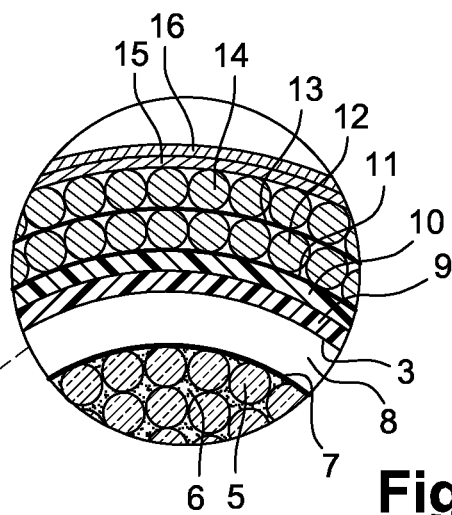
Figure 2:
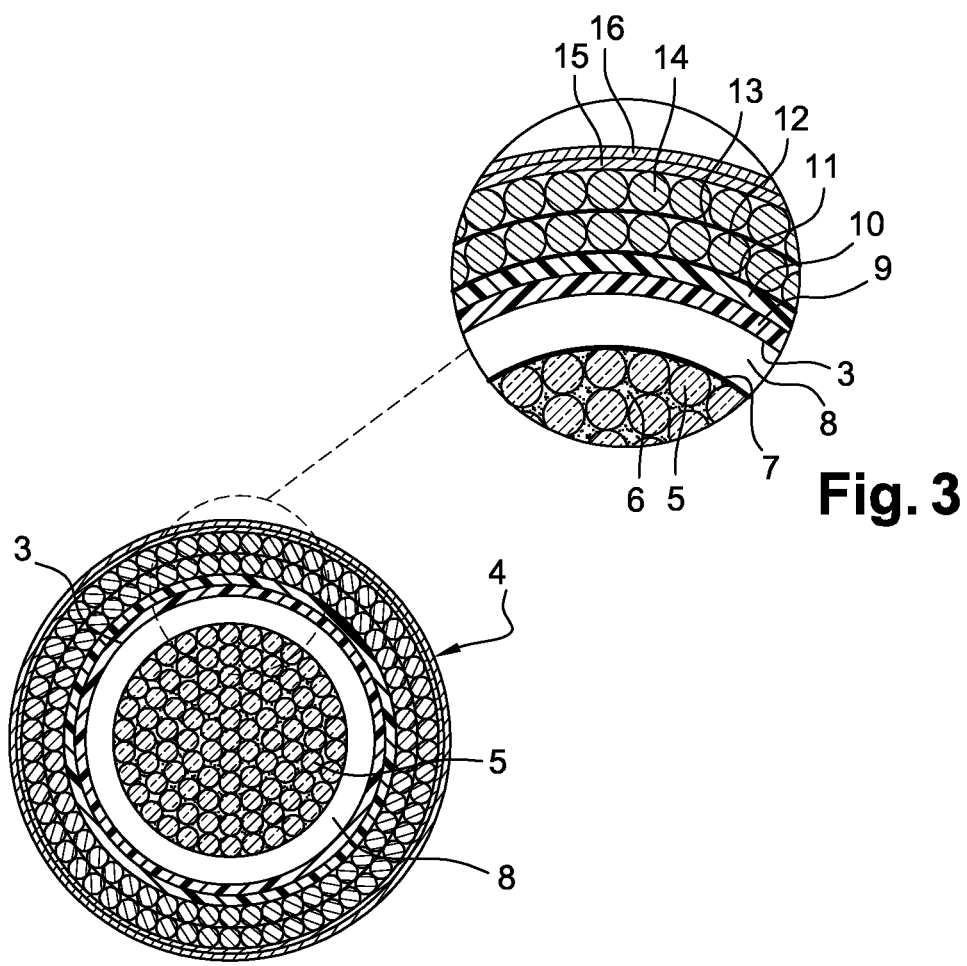

FIG. 1 is a perspective view of a water barrier laminate included in a power cable according to the invention, FIG. 2 is a cross-sectional view of a power cable according to the invention and comprising a water barrier laminate, FIG. 3 is an enlarged view of a specific part of the power cable shows in FIG. 2

DETAILED DESCRIPTION OF THE INVENTION

Referring to FIG. 1, three layers 1, 2a, 2b are shown for this preferred embodiment of a water barrier laminate included in a power cable according to the invention. In the middle is a foil 1 of aluminum or some other similar metal, herein after referred to as metal or aluminum, and on both sides semiconducting polymer layers 2a and 2b are attached. The aluminum is intended to act as a water barrier and an electrical conducting layer and may have any thickness. In a preferred embodiment it may be around 10 micrometers thick.

The polymer layers 2a, 2b may be made from semiconductive polymer films, such as for instance polyolefin. These films 2a, 2b are made semiconductive for instance by including carbon black containing polyethylene. The thickness of these layers may also vary widely, and in a preferred embodiment each of them may have a thickness of about 50 micrometers.

The semiconductive layers 2a, 2b contribute to making the laminate 3 more robust and easy to handle and not as fragile as the aluminum layer 1 by itself. The aluminum foil 1 is also protected better against galvanic corrosion when protected on both sides with layers 2a, 2b.

The different foil layers 1, 2a, 2b may be attached to each other in different ways during construction. One way to do this is to glue them together with suitable glue. This may be a glue layer that does not insulate the layers 1, 2a, 2b from each other either through its inherent properties or because of how it is applied.

Different sorts of glue may be envisaged for the present invention. Hot melt may be used possibly taking advantage of the heat present during production of the cable.

Another way of attaching the different foil layers 1, 2a, 2b to each other is to bond them together with heat and/or pressure as extrusion coating. Bonding the layers 1, 2a, 2b together may also be done in the process of producing the non insulating foils 2a, 2b.

The basic idea is to make an electrically non-insulating water barrier construction where a specially designed aluminum foil laminate is included. Commercially available laminates do not have the wanted electrical properties.

In a medium to high voltage underwater cable, it is of vital importance that the different layers in the cable, outside the electrical insulation system, are non insulating. If the layers in the cable are non insulating, capacitive currents are not led longitudinally along the cable, but on the contrary are led directly, i.e. radially, into the sea water.

One typical example of use of the invention in a cable is provided in FIG. 2.

References to different layers of this cable are indicated in Table 1 below:

TABLE 1

| | |
|---|---|
| 5 | Conductor |
| 6 | Semiconducting Filling Compound |
| 7 | Conductor Screen |
| 8 | Insulation |
| 3 | Metal foil laminate |
| 9 | Sheath Polymer |
| 10 | Sheath Polymer |
| 11 | Tape |
| 12 | Armor |
| 13 | Tape |
| 14 | Armor |
| 15 | Polypropylene-Yarn and Bitumen |
| 16 | Polypropylene-Yarn and Bitumen |

In this cable a conductor 5 is in the center of the cable with a semiconducting filling compound 6 to fill out space between strands 5. Outside this, a conductor screen 7 made of semiconducting polymer is arranged to keep the conductors assembled. Then a layer of insulation 8 comprising insulation and insulation screen is found outside this. Outside this is the metal foil laminate 3 of the invention as a barrier for moisture and possibly also for oxygen. Further outside is found a sheath 9 of a first polymer. This polymer may be of an absorbent type, capable of absorbing moisture having penetrated.

Another sheath 10 of a second polymer outside this intended as a barrier for moisture. Outside this are indicated two sets of tape 11, 13 and armor 12, 14 to strengthen the cable and to comprise a designed-in friction. Two layers of polypropylene-yarn armed bitumen 15, 16 are added on top for further mechanical protection. More than one layer is often used to build up a desired thickness.

This detailed description relates to just one example of how the present invention can be deployed in a cable construction, but the invention is not limited to this sole example.

The function of the semiconducting laminate of aluminum foil is primary to hold the insulation system of a high voltage cable free from moisture. Secondary it functions as an oxygen barrier. This implies that such a laminate can be included in a variety of constructions placed outside the insulation system but inside the mechanical protection of the cable, such as mechanical protective sheathings, armoring with polypropylene yarns, bitumen etc. The aluminum laminate foil has a semiconducting design to radially conduct capacitive currents.

Advantageously, the placement of the laminate can for instance be in between such layers as polymer sheathings and swellable tapes or other type of bonds or in between polymer sheathings on top of swelling tapes, other types of bonds.

The laminate foil can also be used in such a way that some sections of a cable are designed with semiconducting laminate of aluminum foil while other sections of the cable are designed with an insulating laminate of aluminum foil. The latter sections of such cables could advantageously be used for connecting cables to wind mills above the surface of the sea.

A cable design where all the layers are either conducting or semiconducting is preferable to other alternatives, as this eliminates the need for a metallic conductor layer in connection with the insulation screen and the need for interconnections between the metallic layer and the armor in submarine cables.

Another advantage obtained by using aluminum laminate instead of lead as water barrier is that it is more environments friendly. This is not the least important at the end of the lifecycle of the cable.

In this document, the wording "laminate" is to imply the same as "water barrier laminate". The same relates to "non insulating" which is to imply "electrically non insulating".

The invention claimed is:

1. Subsea power cable configured to be in part below sea level and in part above sea level, said subsea power cable comprising:
a first water barrier laminate covering at least part of said subsea power cable,
wherein said first water barrier laminate has foil made of metal laminated between at least two layers of non insulating polymer foils forming a final laminate that is non insulating,
wherein said first water barrier laminate is configured to lead capacitive currents radially into sea water in which said subsea power cable is submersed, and
a second water barrier laminate, covering at least a second part of said subsea power cable, wherein said second water barrier laminate has foil made of metal laminated between at least two layers of insulating polymer foils forming a final laminate that is insulating configured to protect said subsea power cable that is in part above sea level.

2. Power cable as in claim 1, wherein at least one of the surfaces of the laminate is adapted to bond to the other surface of the laminate when the laminate is being lapped or wound around the inner part of the cable that is to be protected with the water barrier.

3. Power cable as in claim 1, wherein at least one of the non insulating polymer foils has glue that is adapted to gluing said polymer foil to the other surface of the laminate when the laminate is being lapped or wound around the inner part of the cable that is to be protected with the water barrier, the glue and gluing adapted not to insulate the layers being glued together.

4. Power cable as in claim 1, wherein at least one of the polymer foils has dissimilar properties to those of one other polymer foil.

5. Power cable as in claim 4, wherein at least one of the polymer foils has a different grade of elasticity than one other polymer foil.

6. Water barrier laminate for use in a power cable according to claim 1, wherein said water barrier laminate has foil made of metal laminated between at least two layers of non insulating polymer foils forming a final laminate that is non insulating.

\* \* \* \* \*